(12) United States Patent
Stelman

(10) Patent No.: US 6,343,126 B1
(45) Date of Patent: Jan. 29, 2002

(54) METHOD AND APPARATUS FOR INTERFACING ANALOG TELEPHONE APPARATUS TO A DIGITAL, ANALOG OR HYBRID TELEPHONE SWITCHING SYSTEM

(75) Inventor: Bruce W. Stelman, San Jose, CA (US)

(73) Assignee: Hello Direct, Inc., San Jose, CA (US)

(*) Notice: Subject to any disclaimer, the term of this patent is extended or adjusted under 35 U.S.C. 154(b) by 0 days.

(21) Appl. No.: 08/994,212

(22) Filed: Dec. 19, 1997

Related U.S. Application Data

(63) Continuation-in-part of application No. 08/625,398, filed on Mar. 27, 1996.
(60) Provisional application No. 60/064,382, filed on Nov. 6, 1997.

(51) Int. Cl.[7] .......................... H04M 9/00; H04M 1/00; H04M 11/00
(52) U.S. Cl. ...................... 379/399; 379/387; 379/167; 379/93.05
(58) Field of Search .......................... 379/387, 93, 399, 379/93.05, 93.29, 167

(56) References Cited

U.S. PATENT DOCUMENTS

| | | | |
|---|---|---|---|
| 3,566,271 A | 2/1971 | Whang et al. | 325/65 |
| 3,715,513 A | 2/1973 | Miller | 179/18 AD |
| 3,865,995 A | 2/1975 | Kerman et al. | 179/99 |
| 3,943,305 A | 3/1976 | Hagedorn | 179/175.3 R |
| 4,088,844 A | 5/1978 | Kinnaird, Jr. | 179/99 |

(List continued on next page.)

FOREIGN PATENT DOCUMENTS

| | | | | |
|---|---|---|---|---|
| DE | 3410145 | 10/1985 | | H04M/3/42 |
| DE | 195 27 806 C | 1/1997 | | H04M/3/42 |
| EP | 0 298 719 | 1/1989 | | H04M/9/08 |
| EP | 0 331 838 | 9/1989 | | H04M/9/00 |
| EP | 0 542 705 A | 5/1993 | | H04Q/3/62 |

(List continued on next page.)

OTHER PUBLICATIONS

Signetics Linear Products, TEA 1060/61 Product Specification, pp. 6–102 to 6–112, Aug. 1, 1988.

(List continued on next page.)

Primary Examiner—Wing F. Chan
(74) Attorney, Agent, or Firm—Haverstock & Owens LLP

(57) ABSTRACT

An adaptive handset interface method and apparatus for interfacing a two-wire analog telephone instrument, such as a modem, fax modem, facsimile machine or teleconferencing device, to a digital, analog or hybrid telephone system, such as a private branch exchange (PBX). The interface device is suitable for use with a variety of PBX's produced by different manufacturers, despite differences in signalling characteristics between the PBX and an associated PBX-compatible telephone. In a preferred embodiment, the invention does not require access to a handset port of a PBX-compatible telephone. The interface device is connected to the extension line along with a PBX-compatible telephone. An analog telephone instrument is then connected to the interface device. In order to communicate with the PBX using a communication protocol appropriate to the PBX, the interface device "learns" the characteristics of the PBX. This is accomplished by: determining whether the telephone system is an analog or digital telephone system; and, if the telephone system is a digital telephone system, monitoring communications between the PBX and the PBX-compatible telephone. Then, the interface device is configured according to the appropriate protocol by retrieving set of operational parameters from a plurality of such sets pre-stored in a memory device within the interface device. The learning technique allows the interface device to automatically adapt itself to variations in signalling characteristics between the PBX and PBX-compatible telephone sets among the different PBX manufacturers.

36 Claims, 4 Drawing Sheets

U.S. PATENT DOCUMENTS

| | | | | |
|---|---|---|---|---|
| 4,142,075 | A | 2/1979 | Olschewski | 179/170 |
| 4,153,916 | A | 5/1979 | Miwa et al. | 358/257 |
| 4,160,122 | A | 7/1979 | Jacobson | 179/1 A |
| 4,161,633 | A | 7/1979 | Treiber | 179/170.2 |
| 4,284,859 | A | 8/1981 | Araseki | 179/170 NC |
| 4,319,092 | A | 3/1982 | van den Enden et al. | 179/18 FA |
| 4,367,374 | A | 1/1983 | Serrano | 179/2 C |
| 4,387,271 | A | 6/1983 | Artom | 179/2 DIP |
| 4,425,664 | A | 1/1984 | Sherman et al. | 375/8 |
| 4,446,335 | A | 5/1984 | Lee et al. | 179/2 C |
| 4,506,112 | A | 3/1985 | Bitsch | 179/81 R |
| 4,588,856 | A | 5/1986 | Cohen | 179/2 C |
| 4,606,044 | A | 8/1986 | Kudo | 375/13 |
| 4,617,656 | A | 10/1986 | Kobayashi et al. | 370/74 |
| 4,636,584 | A | 1/1987 | Binkerd et al. | 379/240 |
| 4,677,667 | A | 6/1987 | Burns | 379/398 |
| 4,689,814 | A * | 8/1987 | Warner, II | 379/93 |
| 4,759,054 | A | 7/1988 | Mellon | 379/145 |
| 4,759,059 | A | 7/1988 | Christensen | 379/161 |
| 4,782,524 | A | 11/1988 | McQuinn et al. | 379/395 |
| 4,788,720 | A | 11/1988 | Brennan et al. | 379/201 |
| 4,815,121 | A | 3/1989 | Yoshida | 379/67 |
| 4,825,465 | A | 4/1989 | Ryan | 379/399 |
| 4,852,153 | A | 7/1989 | Streck | 379/100 |
| 4,852,160 | A | 7/1989 | Kiko et al. | 379/405 |
| 4,856,049 | A | 8/1989 | Streck | 379/67 |
| 4,864,567 | A | 9/1989 | Giorgio | 370/118 |
| 4,873,718 | A * | 10/1989 | Barnett et al. | 379/156 |
| 4,879,738 | A | 11/1989 | Petro | 379/3 |
| 4,894,860 | A | 1/1990 | Korsky et al. | 379/240 |
| 4,907,267 | A | 3/1990 | Gutzmer | 379/442 |
| 4,914,690 | A | 4/1990 | Hagedorn | 379/233 |
| 4,928,306 | A * | 5/1990 | Biswas et al. | 379/201 |
| 4,932,047 | A | 6/1990 | Emmons et al. | 379/53 |
| 4,939,767 | A | 7/1990 | Saito et al. | 379/53 |
| 4,951,312 | A | 8/1990 | Tanikawa et al. | 379/394 |
| D312,627 | S | 12/1990 | Gutzmer | D14/107 |
| 4,984,262 | A | 1/1991 | Kumozaki et al. | 379/5 |
| 4,989,243 | A | 1/1991 | Choi | 379/402 |
| 4,991,196 | A | 2/1991 | Krebs | 379/27 |
| 4,996,706 | A | 2/1991 | Cho | 379/93 |
| 5,001,746 | A | 3/1991 | Nishijima | 379/99 |
| 5,003,580 | A | 3/1991 | Duong et al. | 379/93 |
| 5,014,299 | A | 5/1991 | Klupt et al. | 379/98 |
| 5,018,184 | A | 5/1991 | Abrams et al. | 379/29 |
| 5,034,978 | A | 7/1991 | Nguyen et al. | 379/402 |
| 5,059,141 | A | 10/1991 | Scott | 439/638 |
| 5,073,919 | A | 12/1991 | Hagensick | 379/29 |
| 5,097,501 | A * | 3/1992 | Kutzavitch | 379/165 |
| 5,133,006 | A | 7/1992 | Khuat | 379/399 |
| 5,151,936 | A | 9/1992 | Riedle | 379/403 |
| 5,164,982 | A | 11/1992 | Davis | 379/96 |
| 5,172,411 | A | 12/1992 | Gazsi | 379/402 |
| 5,175,763 | A | 12/1992 | Gazsi | 379/402 |
| 5,179,586 | A | 1/1993 | Lee | 379/93 |
| 5,185,789 | A | 2/1993 | Hanon et al. | 379/395 |
| 5,206,898 | A | 4/1993 | Nishijima | 379/90 |
| 5,237,605 | A | 8/1993 | Peak et al. | 379/399 |
| 5,249,218 | A | 9/1993 | Sainton | 379/59 |
| 5,289,538 | A | 2/1994 | Lauer et al. | 379/402 |
| 5,321,745 | A | 6/1994 | Drory et al. | 379/351 |
| 5,323,449 | A | 6/1994 | Mori et al. | 379/100 |
| 5,323,451 | A | 6/1994 | Yatsunami | 379/100 |
| 5,333,194 | A | 7/1994 | Caesar | 379/402 |
| 5,365,577 | A | 11/1994 | Davis et al. | 379/96 |
| 5,444,770 | A | 8/1995 | Davis et al. | 379/99 |
| 5,448,646 | A | 9/1995 | Lucey et al. | 381/74 |
| 5,454,036 | A | 9/1995 | Gleeman et al. | 379/392 |
| 5,455,859 | A | 10/1995 | Gutzmer | 379/442 |
| 5,471,523 | A | 11/1995 | Smith et al. | 379/165 |
| 5,473,676 | A | 12/1995 | Frick et al. | 379/99 |
| 5,493,609 | A | 2/1996 | Winseck, Jr. et al. | 379/96 |
| 5,528,685 | A | 6/1996 | Cwynar et al. | 379/405 |
| 5,533,092 | A | 7/1996 | Kaziwara | 379/21 |
| 5,550,901 | A | 8/1996 | Williams | 379/93 |
| 5,550,913 | A | 8/1996 | McMaster et al. | 379/230 |
| 5,555,300 | A | 9/1996 | Gutzmer | 379/395 |
| 5,557,669 | A | 9/1996 | Perry et al. | 379/339 |
| 5,557,670 | A | 9/1996 | Perry et al. | 379/339 |
| 5,557,672 | A | 9/1996 | Perry et al. | 379/399 |
| 5,577,115 | A | 11/1996 | Deutsch et al. | 379/399 |
| 5,583,922 | A | 12/1996 | Davis et al. | 379/96 |
| 5,586,181 | A | 12/1996 | Kiko | 379/399 |
| 5,621,731 | A | 4/1997 | Dale et al. | 370/79 |
| 5,625,679 | A | 4/1997 | Gutzmer | 379/99 |
| 5,629,926 | A | 5/1997 | Deutsch et al. | 370/252 |
| 5,631,955 | A | 5/1997 | Adams et al. | 379/387 |
| 5,671,251 | A | 9/1997 | Blackwell et al. | 375/222 |
| 5,825,873 | A | 10/1998 | Duncan et al. | 379/419 |
| 5,999,593 | A * | 12/1999 | Krawiec et al. | 379/15 |

FOREIGN PATENT DOCUMENTS

| | | | | |
|---|---|---|---|---|
| EP | 0 555 015 A | | 8/1993 | H04Q/11/04 |
| EP | 0 690 652 A | | 1/1996 | H04Q/11/04 |
| GB | 2 303 021 A | | 2/1997 | H04Q/11/04 |
| WO | WO 91 16796 A | | 10/1991 | H04Q/11/04 |
| WO | 93/03561 | | 2/1993 | H04L/1/20 |
| WO | WO 93 12622 A | | 6/1993 | H04Q/11/04 |
| WO | WO 95 24792 A | | 9/1995 | H04M/11/06 |
| WO | WO 97 36411 A | | 10/1997 | |

OTHER PUBLICATIONS

K.D. Witt, "Switch Box For Voice/Data Communication" IBM Technical Disclosure Bulletin, vol. 14 No. 5, Oct. 1971.

Precision Components, Inc.'s advertisement for Data Switch in Teleconnect Magazine, May 1988.

TVMP, Inc.'s advertisement for PHONEFLEX in PC Week Magazine, Jun. 1988.

A–Jem's data sheet, Jan. 1988.

Walker Equipment Corp. advetisement for W10 Receiver Amplifier, Sep. 8, 1986, p. 65.

* cited by examiner

METHOD AND APPARATUS FOR INTERFACING ANALOG TELEPHONE APPARATUS TO A DIGITAL, ANALOG OR HYBRID TELEPHONE SWITCHING SYSTEM

This application claims the benefit of U.S. Provisional Application No. 60/064,382, filed Nov. 6, 1997. This application is a continuation-in-part of U.S. application Ser. No. 08/625,398, filed Mar. 27, 1996, the contents of which are hereby incorporated by reference.

FIELD OF THE INVENTION

The invention relates to the field of telephony. More particularly, the invention relates to an adaptive interface for interfacing a two-wire or a four-wire analog telephone instrument to a digital, analog or hybrid telephone switching system.

BACKGROUND OF THE INVENTION

A two-wire analog telephone set of the type commonly found in the homes of telephone service subscribers typically includes a base unit connected to a central office of a telephone service provider via a bi-directional, two-wire, telephone line and also includes a handset connected to the telephone base unit via a four-wire handset cable. The handset cable has four wires because, for two-way voice communication, the handset includes both a microphone and a speaker, each of which requires a pair of wires. Typically, the telephone base supplies audio signals to the speaker and a DC biasing voltage to the microphone, while the telephone base receives audio signals from the microphone. A two-wire to four-wire converter included in the telephone base unit converts the two central office signals into the four handset signals. In addition, the telephone set includes a ring detector for detecting an AC ring signal provided by the central office and a hook-switch for signalling the central office for answering or placing calls. When the handset is removed from its cradle, the hook switch controls draw of DC current from the central office by the telephone set which is detected by the central office.

A conventional modem transmits digital data over a two-wire telephone line by modulating an analog carrier signal according to the digital data. Typically, the digital data is generated by a computer or facsimile machine connected to the modem. The carrier signal is a tone within the frequency range of telephone transmission line. Upon reception by a second modem at the other end of the transmission line, the digital data is reconstructed by demodulating the received signal.

Business organizations often utilize a telephone switching system for providing telephone service to telephone users within the organization. The telephone switching system can have an all-digital interface with its corresponding compatible telephone sets, such as in a digital private branch exchange (PBX). Alternately, the telephone switching system can have an all-analog interface, such as is provided by an analog line card in a PBX or by a central office. In addition, the telephone switching system can provide a combined digital and analog interface with its corresponding compatible telephone sets, such as in a hybrid PBX or a key telephone system (KTS). For the purposes of this document, the term "PBX" is utilized to encompass equipment similar to those the above-listed types of telephone switching equipment.

Telephone sets that are compatible with a particular PBX utilized by a business organization are located on the desks of the users. Each PBX-compatible telephone set is connected to the PBX via a corresponding extension line, while the PBX is connected to a telephone service provider via one or more outside lines. The PBX typically includes capability for appropriately connecting incoming calls to the user telephone sets and for connecting outgoing calls from the user telephone sets to an outside line. In this way, fewer than one outside line per telephone set is needed, thus, reducing the cost of the telephone service. In addition, the PBX typically provides a variety of features to the users of the PBX, such as connecting calls among the users and providing voicemail services.

To implement all of the functions of the PBX, certain control and overhead communications must take place between each user's telephone set and the PBX. These communications typically include digital status, initialization and command signals in addition to the two-way voice signals necessary to carry on a telephone conversation. For example, the PBX must know whether a telephone set is connected to a particular extension line in order to know whether or not to route calls to that extension. As another example, the PBX must interact with the user telephone sets in order for the users to receive incoming calls, initiate outgoing calls, terminate telephone calls and to access voicemail and other features of the PBX.

In general, communication protocols utilized for control and overhead communications differ among the various manufacturers of PBX's. In addition, in an all-digital PBX, the voice signals are communicated between the telephone sets and the PBX as digital samples. Thus, analog voice signals are digitally sampled and encoded according to various different schemes (e.g. $\mu$-law or A-law) before they are communicated. Upon reception, the digital samples are decoded and converted back into analog voice signals. In a hybrid system, voice signals are communicated as analog signals, while control and overhead communications are digital signals. Therefore, a two-wire analog telephone instrument, such as a modem, fax modem, facsimile machine or teleconferencing device, cannot generally interface directly with a PBX. Nor can a four-wire analog telephone instrument, such as a headset, handset or modem, generally interface directly with a PBX.

This creates a problem for users of a PBX who wish to use universally available analog telephone instruments, such as modems, fax modems, facsimile machines, teleconferencing devices, headsets or handsets, in addition to their PBX-compatible telephone sets. This problem has intensified by the recent increase in demand for access to the world wide web, which is typically accessed through use of a modem connected to a personal computer. A proposal has been to provide a dedicated outside line for each such analog telephone instrument. This solution is not entirely satisfactory, however, because it negates the savings which result from the PBX limiting the number of required outside lines. Another solution has been to provide an analog line card in the PBX and a separate line connecting the two-wire analog telephone instrument to the PBX. This solution can be costly due to the need to install separate extension lines to connect each of the PBX-compatible telephone set and the analog telephone instrument to the PBX.

Another solution has been to provide a device which interfaces a modem with a telephone set through the handset port of the telephone set. For example, U.S. Pat. No. 4,907,267 discloses a modem interface device for use with a telephone set having a base unit and a handset. The telephone set can be a two-wire telephone set or a telephone set designed for use with a PBX. To use the modem interface device, the handset is unplugged from the handset jack of the base and plugged into a handset jack in one end of the device. Extending from the device is a four-wire cable which is connected to the handset jack of the base. The device also includes a modular jack for accepting a two-wire cable which connects the device to a two-wire telephone instrument, such as a modem. A series of switches are manually positioned to select between voice and data communications and to configure the interface device to match the signalling characteristics of the particular telephone set being used.

The manually operable switch arrangement described in U.S. Pat. No. 4,907,267 is improved upon in two products manufactured by Unlimited Systems Corp. of San Diego, Calif. A first of these products, the "KONEXX Office Konnector," connects to the base of a telephone set and to the handset to provide an interface for a two-wire telephone, facsimile machine or modem. The device detects when the two-wire telephone, facsimile machine or modem is placed off-hook for switching between voice and data communications. A second of these products, the "KONEXX Konference," is similarly connected between the base and handset, but provides an interface for a teleconferencing device. For each of these devices, a manually operable switch is positioned in one of four positions for adjusting the device to the signalling characteristics of the particular telephone set being used.

The aforementioned interface devices, however, can be inconvenient for interfacing an analog telephone instrument to a PBX. This is because to install such an interface device, the handset cord of a PBX-compatible telephone set must first be disconnected from its base. Then, the interface device must be connected to both the handset and to the base. Next, the analog telephone instrument must be connected to the interface device. Finally, the switch positions for the interface device must be correctly set.

Perhaps a more significant drawback, however, is that each time the analog telephone instrument is used to answer or place a call, the user must manually place the PBX-compatible telephone set off-hook. This is generally accomplished by removing the handset of the PBX-compatible telephone from its cradle. Similarly, when finished using the analog telephone instrument, the user must return the PBX-compatible telephone to its on-hook condition. Otherwise, if the user forgets to return the PBX-compatible telephone to its on-hook condition, incoming calls cannot be connected and will receive a busy indication. In addition, the handset port of the PBX-compatible telephone generally does not provide a ring signal which may be required for automatic answering functions. Another drawback is that some PBX-compatible telephones do not accept DTMF signals through the handset port though DTMF signals may be required by the PBX system for dialing telephone numbers. Thus, for example, auto-dialing features of an analog device will fail to operate. Therefore, the actual telephone keypad must be used to dial for the analog device. Furthermore, the cables required for connecting such an interface device can become tangled and tend to provide a cluttered appearance on the user's desk.

Therefore, what is needed is a technique for interfacing an analog telephone instrument to a PBX that does not require access to the handset port of a PBX-compatible telephone. What is further needed is such a technique that has sufficient flexibility to adapt to the signalling characteristics of a wide variety of commercially available PBX's. What is still further needed is such a technique that requires a minimum of additional cables to accomplish its functions and that minimizes technical ability required from a user.

SUMMARY OF THE INVENTION

The invention is an adaptive interface method and apparatus for interfacing a two-wire analog telephone instrument, such as a modem, fax modem, facsimile machine or teleconferencing device, or a four-wire analog telephone instrument, such as a headset, a handset or a modem, to a private branch exchange (PBX). For purposes of this document, the term "analog telephone instrument" will be used to refer to both two-wire and four wire telephone instruments. The interface device according to the present invention is suitable for use with a variety of PBX's produced by different manufacturers, despite differences in signalling characteristics between the PBX and an associated PBX-compatible telephone. In a preferred embodiment, the invention does not require access to a handset port of the PBX-compatible telephone.

A PBX is generally connected to an associated PBX-compatible telephone via a two-wire telephone extension line. An extension line for a hybrid telephone switching system, however, can include up to eight wires. In a first embodiment of the present invention, both the interface device and the PBX-compatible telephone set are connected to the extension line. An analog telephone instrument is then connected to the interface device. The PBX-compatible telephone communicates with the PBX so as to notify the PBX that the extension line is capable of receiving incoming calls. In addition, the PBX-compatible telephone can initiate and receive telephone calls without interference by the interface device.

The analog telephone instrument can also initiate and receive telephone calls. To initiate an outgoing telephone call originated by the analog telephone instrument, the interface device detects a current draw (a dial tone request) by the analog telephone instrument, as occurs when the analog telephone instrument goes off-hook. Accordingly, the interface device emulates a central office from the perspective of the analog telephone instrument. In response to detecting the analog telephone instrument going off-hook, the interface device communicates an appropriate instruction to the PBX so as to emulate the PBX-compatible telephone going off-hook. This is accomplished without having to manually take the PBX-compatible telephone off-hook. According to the first embodiment, a telephone number to be called is dialed by using a keypad located on the interface device.

To receive an incoming call using the analog telephone instrument, the interface device receives a notification of the incoming call which is sent by the PBX and intended for the PBX-compatible telephone connected to the corresponding extension line. If the analog telephone instrument then goes off-hook, the interface device responds by communicating an appropriate instruction to the PBX so as to emulate the PBX-compatible telephone going off-hook. This is also accomplished without having to manually take the PBX-compatible telephone off-hook.

Once a telephone call is connected to the analog telephone instrument via the interface device, the interface device provides a two-way communication path between the analog telephone instrument and the PBX for voice or modem signals. Thus, the interface device receives voice or modem signals from the analog telephone instrument and converts them into a form suitable for reception by the PBX and receives voice or modem signals from the PBX and converts them into a form suitable for reception by the analog telephone instrument. For example, if the PBX is an all-digital PBX, the interface device performs appropriate analog-to-digital and digital-to-analog conversions.

When an incoming or outgoing telephone call is complete, the interface device detects that current is no longer drawn by the analog telephone instrument, as occurs when the analog telephone instrument is returned to its on-hook condition. In response, the interface device communicates an appropriate instruction to the PBX so as to emulate the PBX-compatible telephone returning to an on-hook condition.

A second embodiment differs from the first embodiment in that the keypad located on the PBX-compatible telephone is utilized to dial a telephone number to be called. According to the second embodiment, a keypad need not be provided on the interface device.

A third embodiment differs from the first and second embodiments in that a keypad located on the analog telephone instrument can be utilized to dial a telephone number to be called. The interface device receives dual-tone, multi-frequency (DTMF) signals which are generated by the analog telephone device as the telephone number is dialed. The interface device then converts these signals into a format appropriate for the PBX.

A fourth embodiment differs from the other embodiments in that the interface device communicates with the PBX so as to notify the PBX that the telephone connected to the extension line is capable of receiving incoming calls. Similar to the third embodiment, the keypad located on the analog telephone instrument can be utilized to dial a telephone number to be called. Thus, in the fourth embodiment, a PBX-compatible telephone is not required to be connected to the extension line along with the interface device.

In order to communicate voice and overhead signals with the PBX using a communication protocol appropriate to the PBX, the interface device must "learn" the characteristics of the PBX. Therefore, when the interface device is coupled to the PBX, a learning technique is performed.

A first step of the learning technique requires that the interface device determine whether or not the telephone system to which it is connected communicates voice signals as digital samples, such as an all-digital PBX, or whether the telephone system communicates voice signals in analog form, such as a hybrid PBX, a KTS, or a central office of a telephone service provider. The primary functions of the telephone sets compatible with each of these types of telephone switching systems are powered directly by the associated telephone switching system. The inventor has observed that the power supply characteristics differ for each type of telephone switching system relative to the modular interface terminal locations and the effective DC source resistances. Accordingly, a determination is made by the interface device polling up to eight terminals coupled to the extension line. By discovering which of the polled terminals are active, the interface device distinguishes between hybrid telephone switching systems and other types of telephone switching systems. Assuming the telephone switching system is a hybrid system, the particular model or manufacturer can generally be identified by discovering which polled terminals are active.

Assuming the telephone switching system is not a hybrid system, up to three DC source resistance measurements are taken for the extension line via the active terminals. A first measurement is an unloaded DC measurement. For the second two measurements, the extension line is loaded by alternate fixed resistive loads. The interface compares the results of these measurements to pre-stored values to determine whether the telephone switching system is an all-digital system or an analog system.

If the system communicates voice signals in a multi-wire hybrid-type format, the interface device configures itself accordingly. Thus, a next step in the learning technique is to emulate an off-hook condition. In response to the emulated off-hook condition, the hybrid PBX provides a dial tone signal to the receive lines of the extension. The interface device detects the dial tone signal and performs level adjustments for both the receive and transmit signal paths. The receive signal path is configured using the dial tone signal and the transmit path is configured using a set of prestored parameters appropriate to the hybrid PBX. This is accomplished by the interface device selecting a stored set of operational parameters from a plurality of such sets.

If the system communicates voice signals in an analog format, the interface device also configures itself accordingly. Thus, a next step in the learning technique is to emulate an off-hook condition. In response to the emulated off-hook condition, the PBX analog line card or central office provides a dial tone signal to the interface device. The interface device detects the dial tone signal and performs level adjustments for both the receive and transmit signal paths. The receive path is configured using the dial tone signal and transmit path is configured by implementing Transmit Objective Loudness Rating (TOLR) sensitivity levels.

Otherwise, if the system communicates voice signals as digital samples, a next step in the learning technique is to determine the signalling protocol which is utilized for communicating between the PBX and the associated PBX-compatible telephones. This is accomplished by the interface device momentarily open-circuiting the extension line. Then, the interface device monitors signals communicated between the PBX and the PBX-compatible compatible telephone which initialize the PBX-compatible telephone and which notify the PBX that the PBX-compatible telephone connected to the extension line is capable of receiving incoming calls.

Then, based upon this determination, the interface device configures itself according to the appropriate signalling protocol. This is accomplished by the interface device selecting a stored set of operational parameters from a plurality of such sets. The sets of operational parameters are pre-stored in a memory device within the interface device. A selected set of operational parameters configures the interface device to communicate with the PBX using a protocol appropriate to the particular PBX being utilized.

Thus, the learning technique allows the interface device to automatically adapt itself to variations in signalling characteristics between the PBX and PBX-compatible telephone sets among the different PBX manufacturers.

DETAILED DESCRIPTION OF A PREFERRED EMBODIMENT

Figure 1:
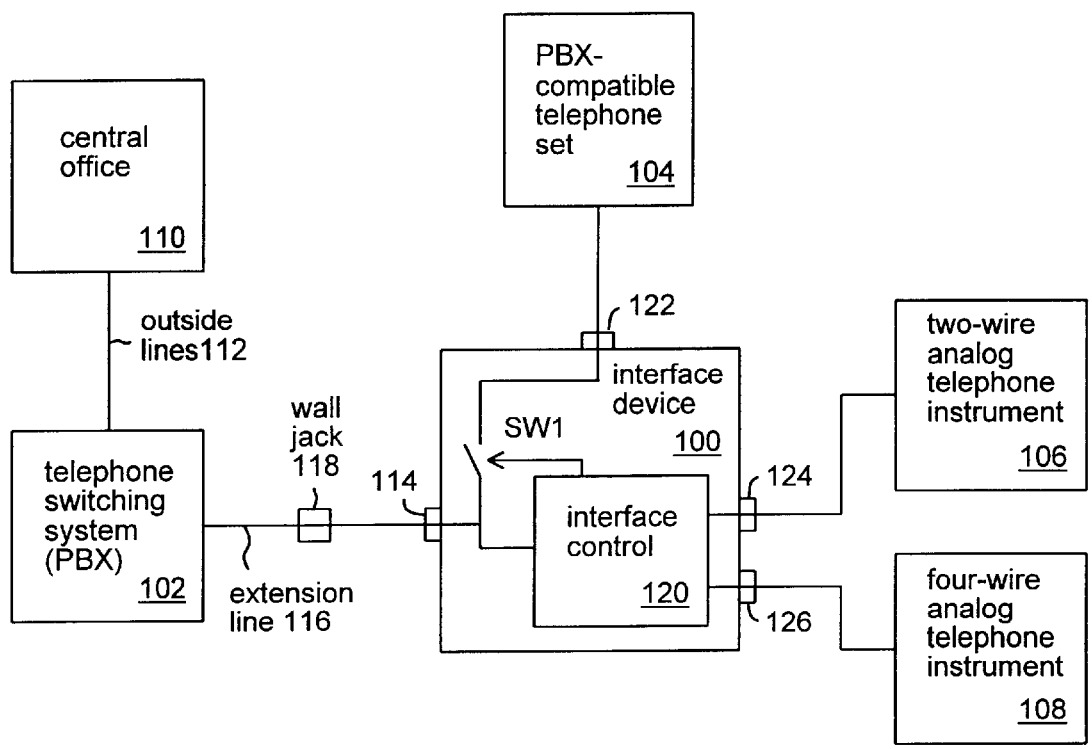
FIG. 1 illustrates a block schematic diagram of an interface device according to the present invention coupled to a PBX, to a PBX-compatible telephone set and to one or more analog telephone instruments.

FIG. 1 illustrates a block schematic diagram of an interface device 100 according to the present invention coupled to a telephone switching system (PBX) 102, to a PBX-compatible telephone set 104, to a two-wire analog telephone instrument 106 and to a four-wire analog telephone instrument 108. The telephone switching system 102 can be an all-digital private branch exchange (PBX), a hybrid PBX, a key telephone system (KTS) or a direct line from a central office 110. For the purposes of this document, the term "PBX" encompasses all of the above-listed types of telephone switching equipment. And, for the purposes of this document, the term "PBX-compatible telephone set" refers to a telephone set 104 specifically designed to interface directly with a particular PBX 102. Typically, the PBX 102 and PBX-compatible telephone set 104 are provided by the same manufacturer. Though several manufacturers produce PBX's and corresponding PBX-compatible telephone sets, a PBX-compatible telephone set provided by a manufacturer is generally not capable of interfacing with a PBX provided by a different manufacturer.

The PBX 102 is coupled to a central office 110 of a telephone service provider via one or more outside lines 112 and is also coupled to a PBX port 114 of the interface device 100 via a extension line 116 and a wall jack 118. The extension line 116 is a two-wire line for most types of telephone switching systems, however, the extension line 116 for a hybrid switching system can include up to eight wires.

As an example, the PBX 102 can be centrally located at a business site, such as in a service room or basement. Several extension lines (only one is shown—extension line 116) extend to corresponding wall jacks (only one is shown—wall jack 118). The wall jacks are typically distributed throughout the business site. The wall jacks can be located in users' offices, conference rooms and reception areas. Conventionally, the PBX-compatible telephone set 104 would be plugged into the wall jack 118. According to the present invention, however, the interface device 100 is plugged into the wall jack 118, while the PBX compatible telephone set 104 is plugged into the interface device 100.

The interface device 100 includes an interface control portion 120 which is coupled to the PBX 102 via the PBX port 114. Internal to the interface device 100, the PBX port 114 is coupled to the interface control portion 120 and to a first terminal of a switch SW1. A second terminal of the switch SW1 is coupled to a PBX phone port 122. The switch SW1 is coupled to be controlled by the interface control portion 120. Also internally to the interface device 100, the interface control portion 120 is coupled to a two-wire analog phone port 124 and to a four-wire analog phone port 126.

Externally to the interface device 100, the PBX-compatible telephone set 104 is plugged into the PBX phone port 122, the two-wire analog telephone instrument 106 is plugged into the two-wire port 124 and the four-wire analog telephone instrument 108 is plugged into the four-wire port 126. In certain embodiments of the present invention, it is not necessary for the PBX-compatible telephone set 104 to always be present to obtain the advantages of the present invention. In addition, it is not necessary that both telephone instruments 106, 108 be present to obtain the advantages of the present invention.

The telephone instruments 106, 108 can each be a modem, fax modem, facsimile machine, teleconferencing device, headset, handset or other type of conventional analog telephone instrument. The four-wire telephone instrument 108 differs from the two-wire telephone instrument 106 primarily in that the four-wire telephone instrument 108 transmits analog signals via a first pair of wires and receives analog signals via a second pair of wires (uni-directional signaling), whereas, the two-wire telephone instrument 106 communicates analog signals in both directions (transmit and receive) via a single pair of wires (bi-directional signaling).

Figure 2:
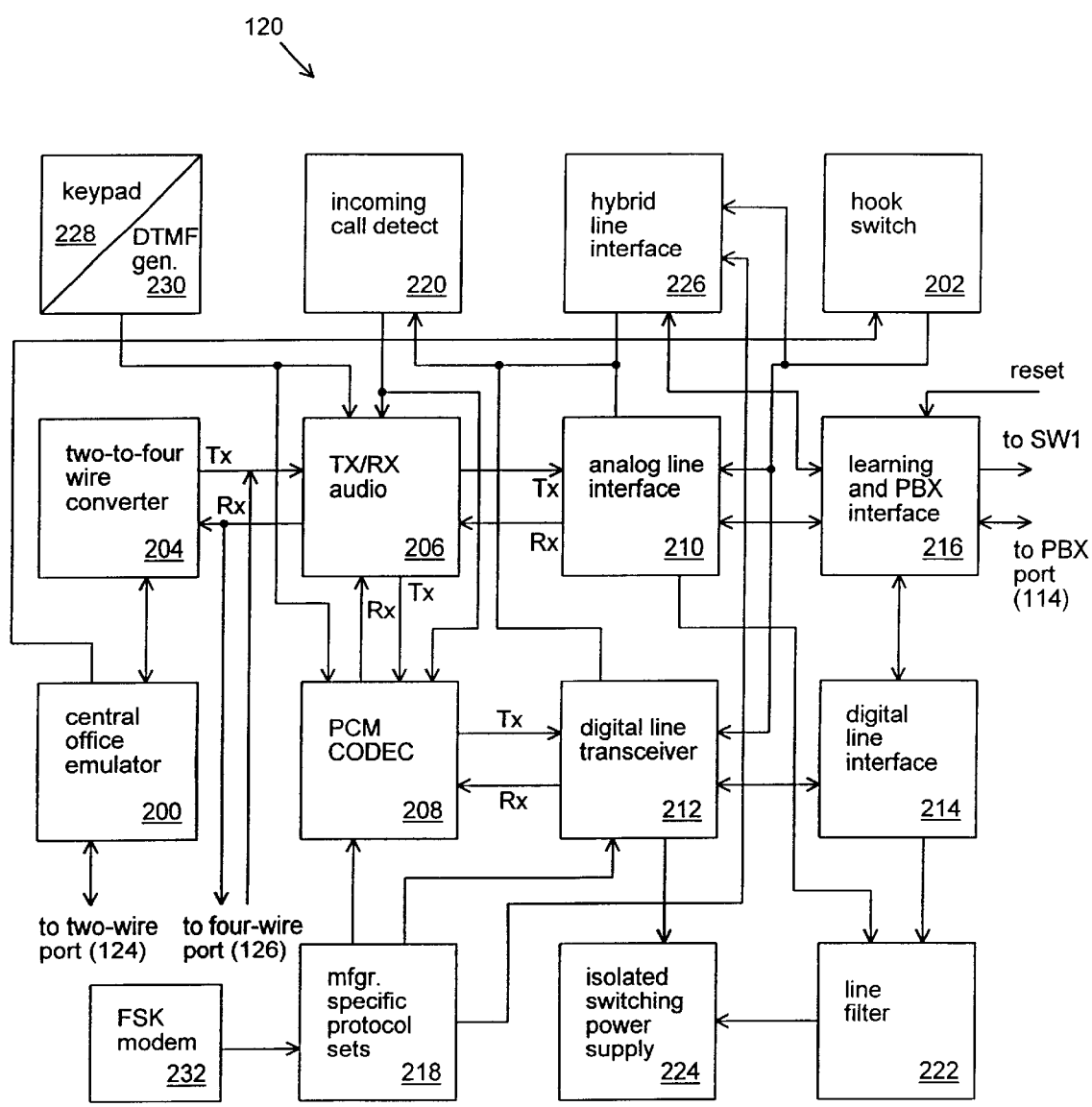
FIG. 2 illustrates a block schematic diagram of the interface control portion of the interface device according to the present invention.

FIG. 2 illustrates a block schematic diagram of the interface control portion 120 of the interface device 100 illustrated in FIG. 1. A central office emulator 200 is coupled to the two-wire port 124 (FIG. 1). The central office emulator 200 provides DC power to the port 124 and detects the on-hook/off-hook condition of the two-wire analog telephone instrument 106 (FIG. 1) depending upon whether it draws current from the central office emulator 200. The central office emulator 200 provides an indication of the on-hook/off-hook condition of the two-wire analog telephone instrument 106 to a hook switch block 202.

The central office emulator 200 is also coupled to a two-to-four wire converter 204. Internally to the central office emulator 200, signals from the two-wire port 124 are routed to the two-to-four wire converter 204. The two-to-four wire converter 204 can be a conventional circuit, commonly known as a hybrid circuit, which converts the bi-directional signals from the two-wire port 124 into separate transmit and receive signals. These separate transmit and receive signals from the two-to-four wire converter 204 are coupled to a TX/RX audio block 206.

The signals from the four-wire port 126 (FIG. 1) are also routed to the TX/RX audio block 206. Two-to-four wire conversion is not required for these signals because they are already separated into transmit and receive channels. An indication of the on-hook/off-hook status for the four-wire telephone instrument can be provided by a user interface (not shown), such as a on/off switch, coupled to the hook switch block 202.

The TX/RX audio block 206 performs appropriate level adjustments for both the receive and transmit signal paths. Thus, the TX/RX audio block 206 includes analog signal processing circuits, such as gain-controllable amplifiers. The RX/TX audio block 206 ensures that the levels of the voice or modem signals received from the PBX 102 (FIG. 1) are adjusted for compatibility with the analog telephone instrument 106 or 108 (FIG. 1) and ensures that the levels of the signals received from the analog telephone instrument 106 or 108 are adjusted for compatibility with the PBX 102.

Via the TX/RX audio block 206, the separate transmit and receive signals from the two-to-four wire converter 204 and from the four-wire port 126 are coupled to a pulse code modulation (PCM) encoder/decoder (CODEC) block 208 and to an analog line interface block 210. Preferably, the PCM CODEC block 208 is selectively active or inactive depending upon whether the PBX 102 (FIG. 1) communicates voice or modem signals over the extension line 116 (FIG. 1) as digital samples or whether the PBX 102 communicates these signals in analog format. If the PBX 102 communicates these signals as digital samples, then the PCM CODEC block 208 is active. Conversely, if the PBX 102 communicates these signals in analog format, then the CODEC block 208 is inactive.

Assuming the PCM CODEC block 208 is active, a digital line transceiver 212 and digital line interface 214 are also active. The PCM CODEC block 208 converts analog voice or modem signals received from the TX/RX audio block 206 into a serial digital data stream. Preferably, this conversion is preformed according to A-LAW or $\mu$-LAW companding techniques. The serial data stream formed by the PCM CODEC block 208 is representative of the voice or modem signal received from the analog telephone instrument 106 or 108 and is provided to the digital line transceiver 212.

The digital line transceiver 212 then combines the digitally sampled voice or modem signals with any necessary overhead or command signals, thereby forming a combined serial data stream. For example, the hook switch block 202 notifies the digital line transceiver 212 of the on-hook/off-hook status of the telephone instrument 106 or 108 (FIG. 1). The digital line transceiver 212 responds by including an appropriate command to the PBX 102 in the combined serial data stream.

The combined serial data stream formed by the digital line transceiver 212 is then provided to the digital line interface block 214. The digital line interface block 214 communicates the combined serial data stream to the PBX via a learning block 216. The digital line interface 214 is preferably controlled by the learning block 216.

Because the combined serial data stream is received by the PBX 102 (FIG. 1), it must be in a format that is compatible with, and understandable by, the particular PBX 102 coupled to the interface device 100. For example, the data must be appropriately synchronized with the PBX 102 and must be appropriately compressed and encoded according to the requirements of the PBX 102. In addition, the command and overhead information included in the combined serial data stream must be recognizable to the PBX 102.

The specific parameters required for appropriately forming the combined serial data stream, however, generally vary among the various manufacturers of PBX's. Therefore, the PCM CODEC block 208 and digital line transceiver 212 are preferably pre-configured to perform analog-to-digital conversion appropriately for the particular PBX 102 coupled to the interface device 100. In addition, the digital line interface 214 is also pre-configured to form the combined serial data stream appropriately for the particular PBX 102 coupled to the interface device 100. This pre-configuration of the PCM CODEC 208, digital line transceiver 212 and digital line interface 214 is performed under control of the learning block 216 and according to data stored in manufacturer specific protocol sets 218.

The digital line interface 214 receives a serial stream of digital data generated by the PBX 102 and provides this serial data stream to the digital line transceiver 212. The digital line transceiver 212 then appropriately separates overhead and commands from voice or modem signals and passes the voice or modem signals to the PCM CODEC 208 for decoding. To perform this function appropriately, the digital line transceiver 212 is pre-configured, under control of the learning block 214 according to data stored in the manufacturer specific protocols block 218.

As an example of operation of the digital line transceiver 212, if the PBX 102 indicates that an incoming telephone call is to be connected to the extension line 116, the digital line transceiver 212 recognizes this condition and, in response, communicates this condition to an incoming call detect block 220. The incoming call detect block 220 then notifies the PCM CODEC block 208 to prepare to receive digital samples from the digital line transceiver 212. The incoming call detect block 220 can also notify the central office emulator 200 to send a ring signal to the two-wire analog telephone instrument 106 (FIG. 1).

Then, when the two-wire analog telephone instrument 106 goes off-hook, the central office emulator 200 (FIG. 2) recognizes this condition and, in response, notifies the hook switch block 202. Alternately, a manual switch notifies the hook switch block when the four-wire analog telephone instrument 108 (FIG. 1) goes off-hook. The hook switch block 202 then appropriately notifies the digital line transceiver 212 which then communicates with the PBX 102 so as to emulate the PBX-compatible telephone set 104 going off-hook.

The PCM CODEC block 208 converts the digital samples received from the digital line transceiver 212 into an analog signal. The digital samples are received as a one-bit-wide stream of digital values. Accordingly, the conversion is performed by appropriately parsing the received stream of digital values into a series of digital values, each digital value having an appropriate width. Then, any compression and/or encoding performed by the PBX 102 (FIG. 1) is reversed. Finally, the analog signal is reconstructed from the series of digital values. To perform this conversion appropriately, the PCM CODEC block 208 is pre-configured, under control of the learning block 216 according to a manufacturer specific format and synchronization of the digital samples stored in the manufacturer specific protocols block 218.

The manufacturer specific protocol sets 218 includes a plurality of sets of conversion parameters appropriate for PBX's produced by various different manufacturers. Each set of parameters includes information relating to an appropriate format and synchronization of the digital samples, decompression and decoding of the digital samples, appropriate compression and encoding of the analog signals into digital samples, generation of commands to the PBX 102 and recognition of commands from the PBX 102. In general, these parameters are specific to each PBX manufacturer.

The analog signal generated by the PCM CODEC block 208 is provided to the TX/RX audio block 206 for routing to the two-wire port 124 via the central office emulator 200 and to the four-wire port 126.

A line filter 222 is coupled to the digital line interface 214 and to the analog line interface 210 for obtaining supply power for the interface device 100 (FIG. 1) from the PBX 102 (FIG. 1) via the extension line 116 (FIG. 1). The interface device 100 can also be externally powered. The line filter 222 filters frequency components above a predetermined threshold from the extension line 116 thereby forming an unregulated DC voltage. Alternately, an unregulated DC voltage can be obtained from a battery supply or from a rectified AC line voltage. The unregulated DC voltage is provided to an isolated switching power supply 224. The isolated switching power supply 224 provides power to the circuits of the interface device 100, but is electrically isolated from the source of power. When the digital line transceiver 212 is active, the digital line transceiver 212 preferably provides a synchronizing signal to the switching power supply 224. This synchronizing signal controls switching of the power supply 224 to occur out of phase with digital-to-analog sampling performed by the PCM CODEC block 208 for minimizing sampling errors caused by switching noise.

Assuming that the PBX 102 communicates voice or modem signals in analog format, such as when an analog line card is used in the PBX 102 or when the PBX 102 is a hybrid switching system, the PCM CODEC block 208 is preferably inactive. The analog line interface 210 receives analog signals from the PBX 102 via a bi-directional communication path through the learning block 216. The analog line interface block 210 converts the bi-directional signals into separate uni-directional transmit and receive signal paths. Accordingly, the analog signals are communicated between the analog line interface block 210 and the TX/RX block 206 via separate uni-directional signal paths.

Separate uni-directional transmit and receive signal paths connect the TX/RX audio block 206 to the four-wire telephone instrument 108 (FIG. 1). For the two-wire telephone instrument 106 (FIG. 1), the two-to-four wire converter 204 converts the separate uni-directional signal paths coupled to the TX/RX audio block 206 into a bi-directional signal path through the central office emulator 200.

The analog line interface block 210 monitors the signals originated by the PBX (FIG. 1) for detecting commands from the PBX. For example, the analog line interface block 210 detects whether an incoming call to is to be connected to the extension line 116. Assuming that the analog line interface block 210 detects an incoming call, the analog line interface block 210 notifies the incoming call detect block 220 of this condition. The incoming call detect block 220 then notifies the TX/RX audio block 206 to prepare to receive incoming voice signals from the PBX 102 (FIG. 1). In response, the incoming call detect block 220 can also notify the central office emulator 200 to send a ring signal to the two-wire analog telephone instrument 106.

The analog line interface block 210 also combines the analog voice or modem signals received from the TX/RX audio block 206 with any necessary overhead or command signals. For example, the hook switch block 202 notifies the analog line interface 210 of the on-hook/off-hook status of the telephone instrument 106 or 108 (FIG. 1). The analog line interface 210 responds by sending an appropriate command to the PBX 102, for example, by drawing a DC current from the PBX 102.

Note that for a hybrid PBX, the overhead and command signals sent to the PBX 102 may be in the form of serialized or parallel digital data, though the voice or modem signals are communicated in analog format. Generally the overhead and command signals for a hybrid system are communicated via separate lines within the extension line 116 (FIG. 1) from the lines utilized for communicating voice signals. As mentioned, when the PBX 102 is hybrid switching system, the voice signals are communicated between the PBX 102 and the analog telephone instrument via the analog line interface 210 and TX/RX audio block 206. For a hybrid switching system, however, a hybrid interface block 226 is provided for communicating overhead and command signals with the PBX 102. The hybrid interface block 226 is preferably pre-configured under control of the learning block 216 and according to data stored in manufacturer specific protocol sets 218.

As an example of operation of the hybrid interface block 226, when the PBX 102 sends a command that an incoming call is to be directed to the extension line 116, the hybrid interface block 226 notifies the incoming call detect block 220. Also, when the hook switch block 202 indicates to the hybrid interface block 226 that the analog telephone instrument 106 or 108 (FIG. 1) is off-hook, the hybrid interface block 226 requests a dial tone from the PBX 102.

An FSK modem 232 is also coupled to the manufacturer specific protocol sets 218. The FSK modem 232 allows updates, additions, or modifications to be made to the manufacturer specific protocol sets 218 from a remote location over a telephone line connection.

According to a first embodiment of the present invention, a keypad 228 and a dual-tone, multi-frequency (DTMF) generator 230 are provided for initiating telephone calls from the analog telephone instrument 106 or 108 (FIG. 1). The keypad 228 is coupled to the DTMF generator 230. The DTMF generator 230 is coupled to the TX/RX audio block 206 and to the PCM CODEC block 208. For example, to initiate a telephone call, the two-wire analog telephone instrument 106 is placed off-hook. In response, the central office emulator 200 notifies the hook switch block 202 of this condition. The hook switch block 202 then notifies the analog line interface 210, the digital line transceiver 212 and the hybrid line interface 226. An active one of the analog line interface 210 or the digital line transceiver 212 then sends an appropriate command to the PBX 102 (FIG. 1) so as to emulate the PBX-compatible telephone set 104 (FIG. 1) going off-hook. Once the PBX recognizes that call is to be initiated, the keypad 228 is utilized to dial the telephone number to be called. The DTMF generator 230 then generates dual tones for each digit of a telephone number dialed via the keypad 228.

In an alternate embodiment, the keypad 228 is replaced with a voice recognition block which converts a user's voice commands into signals appropriate for controlling the DTMF generator block 230. Such an embodiment could be utilized, for example, so that the user's hands remain free to perform other tasks, or could be utilized by persons having limited use of their hands.

The dual tones are then provided by the DTMF generator 230 to the TX/RX audio block 206 and to the PCM CODEC block 208. Assuming that the PBX 102 is has an analog interface, the dual tones are passed to the PBX 102 through the analog line interface 210 and learning block 216. Otherwise, assuming the PCM CODEC block 208 is active, the dual tones are converted according to the protocol required for the particular PBX 102 (FIG. 1) being utilized. Accordingly, the PCM CODEC block 208 is pre-configured for this conversion under control of the learning block 216 and according to data stored in manufacturer specific protocol sets 218. The appropriately converted dual tones are then passed to the PBX 102 via the digital line transceiver 212, the digital line interface 214 and the learning block 216.

A second embodiment differs from the first embodiment in that the keypad located on the PBX-compatible telephone set 104 (FIG. 1) is utilized to dial a telephone number to be called. According to the second embodiment, therefore, the keypad 228 (FIG. 2) and DTMF generator (FIG. 2) 230 need not be provided.

A third embodiment differs from the first and second embodiments in that a keypad located on the analog telephone instrument 106 or 108 (FIG. 2) can be utilized to dial a telephone number to be called. The interface device 100 (FIG. 1) receives dual-tone, multi-frequency (DTMF) signals which are generated by the analog telephone device 106 or 108 (FIG. 1) as the telephone number is dialed. An active one of the TX/RX audio block 206 (FIG. 2) or PCM CODEC 208 (FIG. 2) then converts these signals into a format appropriate for the PBX 102 (FIG. 1).

A fourth embodiment differs from the other embodiments in that the interface device 100 (FIG. 1) communicates with the PBX 102 (FIG. 1) so as to notify the PBX 102 that the extension line 116 (FIG. 1) is capable of receiving incoming calls. A keypad located on the analog telephone instrument 106 or 108 (FIG. 1) or the keypad 226 (FIG. 2) can be utilized to dial a telephone number to be called. Thus, in the fourth embodiment, a PBX-compatible telephone set 104 (FIG. 1) is not required to be connected to the extension line 116 along with the interface device 100 (FIG. 1). In this embodiment, however, a PBX-compatible telephone set 104 is required for appropriately configuring the interface device 100. Once the interface device 100 is appropriately configured, the PBX-compatible telephone set 104 can be disconnected from the interface device 100.

When an incoming or outgoing telephone call is complete, the central office emulator 200 (FIG. 2) of the interface device 100 (FIG. 1) detects that current is no longer drawn by the analog telephone instrument 106 or 108, as occurs when the analog telephone instrument 106 or 108 is returned to its on-hook condition. In response, the central office emulator 200 (FIG. 2) recognizes this condition and notifies the hook switch block 202 (FIG. 2). The hook switch block 202 then notifies an active one of the digital line transceiver 212 or analog line interface 210, which then communicates with the PBX 102 so as to emulate the PBX-compatible telephone set 104 returning to its on-hook condition.

In order to appropriately configure the interface device 100 (FIG. 1), particularly the PCM CODEC block 208, the digital line transceiver 212, the TX/RX audio block 206, the hybrid line interface 226 and the analog line interface block 210 to communicate with the PBX 102 (FIG. 1) according to a communication protocol appropriate to the particular PBX 102 being utilized, the interface device 100 must "learn" the characteristics of the PBX 102. To accomplish this, the interface device 100 performs a learning algorithm.

Figure 3:
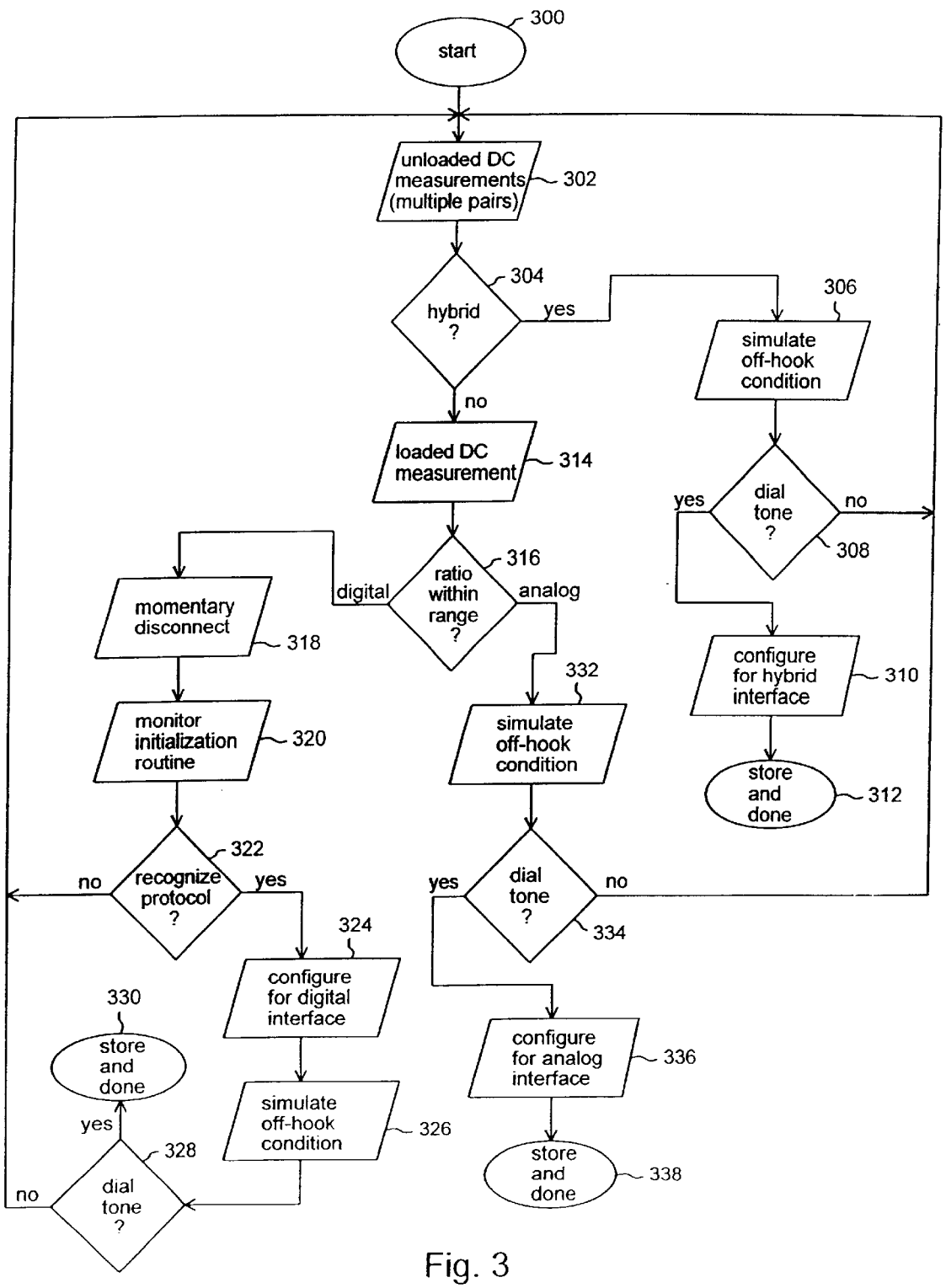
FIG. 3 illustrates a flow diagram of a learning algorithm according to the present invention.

FIG. 3 illustrates a flow diagram of a learning algorithm which controls operation of the learning block 216 (FIG. 2) according to the present invention. The learning algorithm is initiated for appropriately configuring the interface device 100 (FIG. 1). Thus, logic circuitry included in the learning block 216 perform the function of determining whether the telephone switching system 102 communicates voice signals as digital samples or in analog format. In addition, logic circuitry included in the learning block 216, in conduction with data stored in the manufacturer specific protocol sets 218 (FIG. 2), perform the functions of identifying a communication protocol utilized by the telephone switching system 102 and configuring the interface device 100 according to the protocol. It will be apparent, however, that a microprocessor or controller circuit operating according to a stored software program could also perform these same functions.

As an example, the learning algorithm determines which one or ones of the digital line interface block 214, the analog line interface block 210 and the hybrid line interface block 226 is to be active. The learning algorithm can be initiated each time power is supplied to the interface device 100. Alternately, the learning algorithm is initiated each time a reset control input is applied to the learning block 216 (FIG. 2). For example, the control input can be in response to a user pressing a button on the interface device 100.

Upon initiation, the learning algorithm moves from a state 300 to a state 302. Preferably, the learning algorithm determines whether or not the PBX 102 (FIG. 1) to which the interface device 100 (FIG. 1) is connected communicates voice signals as digital samples, such as an all-digital PBX, or whether the telephone system communicates voice signals in analog form, such as a hybrid PBX or a KTS. Note that a central office of a telephone service provider also communicates voice signals in analog form. Thus, assuming the interface device 100 is connected directly to a central office 110 (FIG. 1) of a telephone service provider, rather than to a PBX 102 (FIG. 1), the learning algorithm appropriately configures the interface device 100.

The inventor has observed that the power supply characteristics of the extension lines 116 (FIG. 1) differ for each of these types of telephone switching systems relative to the modular interface terminal locations and the effective DC source resistances as measured via the PBX port 114 (FIG. 1). For example, a hybrid switching system generally has more active wires in the extension lines 116 than does either an analog line interface to a PBX or an all-digital interface to a PBX. In addition, a DC source resistance for an analog interface tends to be higher than a DC source resistance for an all-digital interface.

Accordingly, in the state 302, the interface device polls up to eight terminals of the port 114. This is accomplished by measuring a voltage across selected pairs of the wires included in the extension line 116 via the PBX port 114 (FIG. 1). By discovering which of the polled terminals are active, the interface device 100 (FIG. 1) distinguishes between hybrid telephone switching systems and other types of telephone switching systems. Assuming the PBX 102 is a hybrid system, the particular model or manufacturer can generally be identified by discovering which polled terminals are active.

Once the step of polling is complete, the learning algorithm moves from the state 302 to the state 304. Based upon the results of the polling performed in the state 302, the learning algorithm determines whether or not the PBX is a hybrid PBX.

Assuming that the switching system communicates according to a multi-wire hybrid-type format, the learning algorithm moves from the state 304 to a state 306. In the state 306, the interface device 100 emulates an off-hook condition. Then, the learning algorithm moves from the state 306 to a state 308. In response to the emulated off-hook condition, the hybrid PBX is expected to provide a dial tone signal to the receive wires of the extension line 116. If the interface device 100 does not detect the dial tone signal in the state 308, this indicates that an erroneous measurement was performed in the state 302. Therefore, the learning algorithm returns from the state 308 to the state 302 where the measurements are repeated. If the interface device 100 is not appropriately configured after a predetermined number of attempts, then the interface device 100 preferably indicates an error condition.

Assuming the interface device 100 detects the dial tone signal in the state 308, the interface device 100 moves to a state 310. In the state 310, the interface device 100 configures itself for a hybrid interface by performing level adjustments for both the receive and transmit signal paths through the TX/RX audio block 206 (FIG. 2). The receive signal path is configured using the dial tone signal and the transmit signal path is configured according to a selected set of parameters appropriate to the hybrid PBX from the manufacturer specific protocol sets 218. This appropriately configures the interface device 100 for providing voice communication between the PBX 102 (FIG. 1) and analog telephone instrument 106 or 108 (FIG. 1). Additionally, in the state 310, the hybrid line interface 226 (FIG. 2) is configured to communicate overhead and commands to the PBX 102 according to parameters stored in the manufacturer specific protocol sets 218. Once the interface device 100 has been appropriately configured in the state 310, the learning algorithm moves to a state 312 which signifies that the learning algorithm is complete. Also in the state 312, the configuration parameters obtained in the state 310 are stored in non-volatile memory, such as a serial EEPROM, so that they will not be lost in the event of a power failure.

Assuming that in the state 304 it is determined that the PBX 102 (FIG. 1) is not a hybrid system, then the learning algorithm moves from the state 304 to a state 314. Because the PBX 102 is not a hybrid PBX, the interface to the PBX 102 can be an analog interface, as in the case of an analog line card or a central office. Alternately the interface to the PBX 102 can be a digital interface, as in the case of an all-digital PBX. In either case, the extension line 116 (FIG. 1) is expected to include only two active wires.

The inventor has observed that a difference between these types of telephone systems is in a DC source resistance measured via the two active wires of the extension lines 116 (FIG. 1). For example, a central office of a telephone service provider typically provides an unloaded line voltage of 48 volts dc. A source resistance depends upon the distance to the central office, however, 1300 ohms is typical. All-digital PBX's generally have unloaded line voltages between 14 and 48 volts DC with source resistances between 30 and 60 ohms. It can be seen, therefore, that PBX's that communicate voice signals as digital samples generally have much lower source resistance than a central office or a PBX that communicates voice signals in analog format. Therefore, the determination of whether or not the PBX 102 (FIG. 1) communicates voice signals as digital samples or in analog form is accomplished by effectively measuring the DC source resistance.

Figure 4:
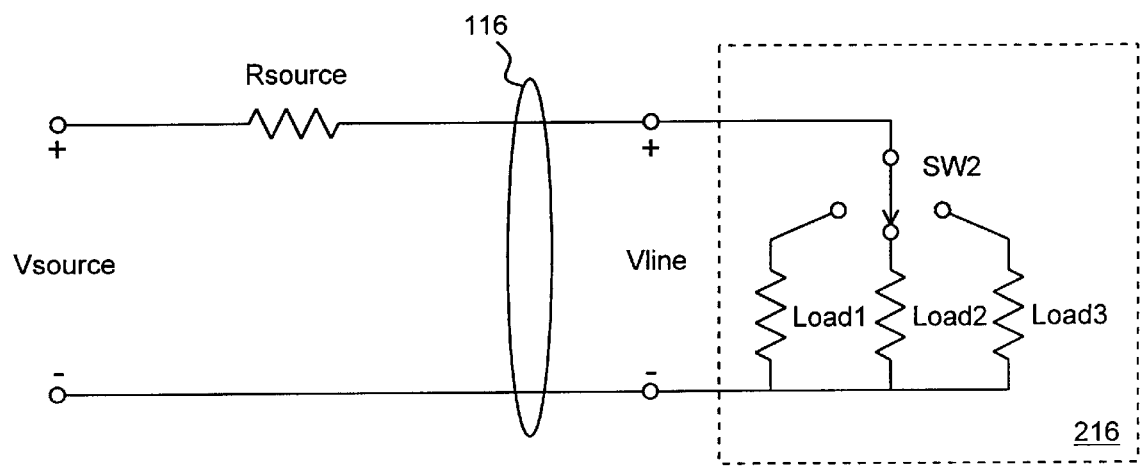
FIG. 4 illustrates a schematic diagram of a circuit for measuring a source resistance of the extension lines according to the present invention.

FIG. 4 illustrates a schematic diagram of a circuit for measuring a source resistance of the extension lines 116 (FIG. 1) according to the present invention. A DC voltage, Vsource, is provided by the PBX 102 (FIG. 1) via a series resistance Rsource. A DC voltage, Vline, is received by the learning block 216 of the interface device 100 (FIG. 1). A switch SW2 selectively coupled one of three resistive loads across the extension lines 116. A first load LOAD1 has a large resistance value (e.g. greater than 20 M ohms or open circuit) so as to leave the extension line essentially unloaded. Second and third loads LOAD2 and LOAD3 have alternate values which are lower than the value of LOAD1 so as to the load the extension lines to varying degrees. For example, the value of LOAD2 can be comparable to an expected value of the source resistance Rsource for an analog interface (e.g. approximately 1 K ohms), while the value of LOAD3 can be comparable to an expected value of the source resistance Rsource for an all-digital interface (e.g. approximately 50 ohms), but is preferably a higher resistance to avoid any potentially excessive flow of current.

In the state 314, three DC source resistance measurements are taken for the extension line 116 (FIG. 1) via the active two terminals of the PBX port 114 (FIG. 1). A first measurement is an unloaded DC measurement. For this measurement, the switch SW2 is coupled to the first resistance LOAD1 and the resultant level of the voltage Vline is detected. Similarly, for the second measurement, the switch SW2 is coupled to the second resistance LOAD2 and the resultant level of the voltage Vline is detected. For the third measurement, the switch SW2 is coupled to the third resistance LOAD3 and the resultant level of the voltage Vline is detected. For each measurement the value of Vline is influenced by the relative values of Rsource and the resistance value coupled to the switch SW2 by voltage division.

Then the learning algorithm moves from the state 314 to a state 316. Because the results of the measurements taken in the state 314 are indicative of the values of Rsource and Vsource, in the state 316, the interface device 100 compares the results of these measurements, or ratios thereof, to pre-stored values to determine whether the telephone switching system is an all-digital system or an analog system.

If the comparison made in the state 316 indicates that the PBX 102 (FIG. 1) communicates voice signals as digital samples, a next step in the learning algorithm is to determine the signalling protocol which is utilized for communicating between the PBX 102 and the associated PBX-compatible telephone set 104 (FIG. 1). Accordingly, the learning algorithm moves from the state 316 to a state 318.

In the state 318, the interface device 100 (FIG. 1) momentarily disconnects the PBX-compatible telephone set 104 (FIG. 1) from the extension line 116 (FIG. 1) by momentarily opening the switch SW1 (FIG. 1) and then closing the switch SW1. Then, learning algorithm moves from the state 318 to a state 320.

The PBX 102 (FIG. 1) detects that the PBX-compatible telephone set 104 has been disconnected and, then, reconnected to the extension lines 116. In response, the PBX 102 communicates with the PBX-compatible telephone set 104 to initialize the PBX-compatible telephone set 104. These initialization signals differ among the various manufacturers and models of PBX's. Therefore, they provide indicia (a "signature") by which the particular PBX manufacturer and model can be recognized.

In the state 320, the interface device 100 (FIG. 1) monitors the indicia provided by these initialization signals communicated between the PBX 102 (FIG. 1) and the PBX-compatible telephone set 104 (FIG. 1) and compares them to pre-stored indicia. Each pre-stored indicia is stored in the manufacturer specific protocol sets 218 in association with a corresponding one of the sets of parameters utilized for appropriately configuring the interface device 100 (FIG. 1). Then, the learning algorithm moves to a state 322. Assuming that the interface device 100 recognizes the indicia (the "signature") provided by the initialization signals, the interface device 100 configures itself according to the appropriate signalling protocol. Accordingly, the learning algorithm moves from the state 320 to a state 322.

In the state 322, the learning block 216 selects an appropriate stored set of operational parameters from a plurality of such sets pre-stored in the manufacturer specific protocol sets 218 and appropriately configures the PCM CODEC 208 and digital line transceiver 212 according to the selected set. Then, the learning algorithm moves from the state 324 to a state 326.

In the preferred embodiment, once the interface device 100 (FIG. 1) is appropriately configured for the particular PBX 102 (FIG. 1) being utilized, a verification is performed. Therefore, in the state 326, the interface device 100 sends a command to the PBX 102 (FIG. 1) which simulates the PBX-compatible telephone set 104 (FIG. 1) going off-hook. Then, the learning algorithm moves from the state 326 to a state 328. In the state 328, the interface device 100 determines whether the PBX 102 is providing a dial tone in response to the command sent in the state 324. Assuming a dial tone is detected, the learning algorithm moves to state 330 which signifies that the learning algorithm is complete. Also in the state 330, the protocol and system configuration parameters are preferably stored in non-volatile memory, such as a serial EEPROM, so that they will not be lost in the event of a power failure.

Alternately, if in the state 328, a dial tone is not detected, or, if in the state 322, the interface device 100 does not recognize the indicia (the "signature") the learning algorithm returns to the state 302, and learning algorithm begins again. If the interface device 100 is not appropriately configured after a predetermined number of attempts, then the interface device 100 preferably indicates an error condition.

Assuming the PBX 102 (FIG. 1) communicates voice signals in an analog format, the interface device 100 (FIG.

1) configures itself accordingly. Thus, if it is determined in the state 316 that the PBX 102 communicates voice signals in an analog format, the learning algorithm moves from the state 316 to a state 332. In the state 332, the interface device 100 emulates an off-hook condition. In the preferred embodiment, this is accomplished by placing an appropriate resistance across the extension lines 116 so that the PBX 102 senses a current draw via the extension lines 116. Then, the learning algorithm moves from the state 332 to a state 334.

In response to the emulated off-hook condition, the PBX 102 (FIG. 1) is expected to provide a dial tone signal to the extension lines 116 (FIG. 1). Accordingly, in the state 334, the interface device 100 determines whether the dial tone is detected. Assuming that the dial tone is detected, the learning algorithm moves from the state 334 to a state 336.

In the state 336 and based upon the level of the dial tone signal, the interface device 100 performs level adjustments for both the receive and transmit signal paths through TX/RX audio block 206 of the interface device 100. The receive path is appropriately configured first utilizing the dial tone. Then, using side tone characteristics linking the receive and transmit paths, the transmit path is appropriately configured. The transmit path is preferably configured by implementing Transmit Objective Loudness Rating (TOLR) sensitivity levels.

Once the transmit and receive paths have been appropriately configured, the learning algorithm moves to state 338 which signifies that the learning algorithm is complete. Also in the state 338, the protocol and system configuration parameters are preferably stored in non-volatile memory, such as a serial EEPROM, so that they will not be lost in the event of a power failure.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in several different ways and the apparatus disclosed above is only illustrative of the preferred embodiment of the present invention and is in no way a limitation.

What is claimed is:

1. A method of interfacing an analog telephone instrument to a telephone switching system, the method comprising steps of:
   a. providing a signal path for communicating signals between the analog telephone instrument and the telephone switching system;
   b. identifying a communication protocol utilized by the telephone switching system from among a plurality of communication protocols; and
   c. configuring the signal path to operate according to the protocol, such that if the analog telephone instrument and the telephone switching system operate according a same protocol signals are passed unaltered and if the analog telephone instrument and the telephone switching system operate according different protocols one from the other, the signals are translated as they are passed between the analog telephone instrument and the telephone switching system.

2. A method of interfacing an analog telephone instrument to a telephone switching system, the method comprising steps of:
   a. providing a signal path for communicating signals between the analog telephone instrument and the telephone switching system;
   b. identifying a communication protocol utilized by the telephone switching system from among a plurality of communication protocols wherein the step of identifying the communication protocol comprises a step of initiating the telephone switching system to communicate with a telephone set wherein the telephone set is pre-configured for compatibility with the telephone switching system; and
   c. configuring the signal path according to the protocol.

3. The method according to claim 2 wherein the signal path is utilized for communicating voice and control signals between the analog telephone instrument and the telephone switching system.

4. The method according to claim 3 further comprising a step of detecting an on-hook/off-hook condition of the analog telephone instrument.

5. The method according to claim 4 further comprising a step of providing an indication of the on-hook/off-hook condition of the analog telephone instrument to the telephone switching system via the signal path in response to the analog telephone instrument changing from an on-hook condition to an off-hook condition.

6. The method according to claim 4 further comprising a step of providing an indication of the on-hook/off-hook condition of the analog telephone instrument to the telephone switching system via the signal path in response to the analog telephone instrument changing from an off-hook condition to an on-hook condition.

7. The method according to claim 2 wherein the signal path includes a converter for converting digital voice samples into an analog signal.

8. The method according to claim 1 wherein the step of initiating comprises a step of momentarily disconnecting the telephone set from an extension line coupled to the telephone switching system.

9. The method according to claim 8 wherein the step of identifying further comprises a step of monitoring communication between the telephone switching system and the telephone set.

10. The method according to claim 9 wherein the step of identifying further comprises a step of forming indicia of the communication between the telephone switching system and the telephone set.

11. The method according to claim 10 wherein the step of identifying further comprises a step of comparing the indicia to a plurality of pre-stored indicia wherein each pre-stored indicia is stored in association with a corresponding set of operational parameters for configuring the signal path according to a corresponding one of the plurality of communication protocols.

12. The method according to claim 11 further comprising a step of retrieving a set of corresponding parameters when a match is found during the step of comparing.

13. A method of interfacing an analog telephone instrument to a telephone switching system, the method comprising steps of:
   a. determining whether the telephone switching system communicates voice signals as digital samples or in analog format wherein the step of determining includes a step of measuring a first voltage supplied by the telephone switching system to a resistive load;
   b. activating a first signal path through the apparatus when the telephone system communicates voice signals as digital samples, the first signal path for communicating the voice signals between the analog telephone instrument and the telephone switching system wherein the first signal path includes a converter for converting the digital samples into an analog signal; and c. activating a second signal path through the apparatus when the telephone system communicates voice signals in analog format, the second signal path for communicating the voice signals between the analog telephone instrument and the telephone switching system wherein the second signal path includes analog signal processing circuits.

14. The method according to claim 13 further comprising a step of adapting an active one of the first and second signal paths according to requirements of the telephone switching system.

15. The method according to claim 13 further comprising a step of adapting the second signal path according to requirements of the telephone switching system wherein the step of adapting comprises a step of adjusting an amplification level according to a level of a dial tone provided by the telephone switching system.

16. The method according to claim 15 wherein the step of determining further comprises a step of measuring a second voltage supplied by the telephone switching system under unloaded conditions.

17. The method according to claim 16 wherein the step of determining further comprises a step of comparing a ratio of the first and second voltages to a range of expected ratios.

18. The method according to claim 13 further comprising a step of identifying a communication protocol utilized by the telephone switching system.

19. The method according to claim 18 further comprising a step of detecting an on-hook/off-hook condition of the analog telephone instrument.

20. The method according to claim 19 further comprising a step of providing an indication of the on-hook/off-hook condition of the analog telephone instrument to the telephone switching system in accordance with the identified protocol in response to the analog telephone instrument changing from an on-hook condition to an off-hook condition.

21. The method according to claim 19 further comprising a step of providing an indication of the on-hook/off-hook condition of the analog telephone instrument to the telephone switching system in accordance with the identified protocol in response to the analog telephone instrument changing from an off-hook condition to an on-hook condition.

22. An interface apparatus for interfacing an analog telephone instrument to a telephone switching system, the interface apparatus comprising:

a. a first port configured for coupling the apparatus to the telephone switching system wherein the telephone switching system is a private telephone switching system;

b. a second port configured for coupling the apparatus to a telephone set wherein the telephone set is preconfigured for compatibility with the telephone switching system;

c. a third port configured for coupling the apparatus to the analog telephone instrument;

d. a switch for selectively coupling the first port to the second port; and e. a control circuit coupled for controlling the switch wherein the control circuit controls the switch to momentarily disconnect the first port from the second port for initiating communication between the telephone switching system and the telephone set.

23. The interface apparatus according to claim 22 wherein the control circuit comprises a first signal path between the first port and the third port.

24. The interface apparatus according to claim 23 wherein the first signal path includes a converter for converting digital samples into an analog signal.

25. The interface apparatus according to claim 24 wherein the telephone switching system communicates voice signals as digital samples.

26. The interface apparatus according to claim 25 wherein the control circuit comprises a second signal path between the first port and the third port and wherein the second signal path does not include a converter for converting an analog signal into digital samples.

27. The interface apparatus according to claim 26 wherein the first signal path is active when the telephone switching system communicates the voice signals as digital samples and wherein the second signal path is active when the telephone switching system communicates the voice signals in analog format.

28. The interface apparatus according to claim 26 wherein the control circuit detects an on-hook/off-condition of the analog telephone instrument and notifies the telephone switching system via an active one of the first or second signal paths in response to a change in the on-hook/off-hook condition of the analog telephone instrument.

29. The interface apparatus according to claim 22 wherein the control circuit detects an on-hook/off-condition of the analog telephone instrument and notifies the telephone switching system in response to a change in the on-hook/off-hook condition of the analog telephone instrument.

30. A method of interfacing an analog telephone instrument to a telephone switching system, the method comprising steps of:

a. determining whether the telephone switching system is a hybrid telephone switching system wherein the step of determining whether the telephone switching system is a hybrid telephone switching system comprises a step of monitoring a first selected pair of wires included in an extension line coupled to the telephone switching system;

b. activating a first signal path through the apparatus when the telephone system is a hybrid telephone switching system, the first signal path for communicating the voice signals between the analog telephone instrument and the telephone switching system wherein the first signal path includes analog signal processing circuits; and c. when the telephone switching system is not a hybrid telephone switching system, determining whether the telephone switching system communicates voice signals as digital samples or in analog format.

31. The method according to claim 30 further comprising a step of activating a second signal path through the apparatus when the telephone system communicates voice signals as digital samples, the second signal path for communicating the voice signals between the analog telephone instrument and the telephone switching system wherein the second signal path includes a converter for converting the digital samples into an analog signal.

32. The method according to claim 30 further comprising a step of activating the first signal path when the telephone switching system communicates voice signals in analog format.

33. The method according to claim 32 wherein the step of determining whether the telephone switching system is a hybrid telephone switching system comprises a step of monitoring a second selected pair of wires included in the extension line.

34. The method according to claim 30 wherein the step of determining whether the telephone switching system communicates voice signals as digital samples or in analog format comprises steps of:
   a. placing a first load across a selected pair of wires included in an extension line coupled to the telephone switching system; and
   b. monitoring a first voltage level across the load.

35. The method according to claim 34 further comprising steps of:
   a. placing a second load across the selected pair of wires included in the extension line;
   b. monitoring a second voltage level across the load; and
   c. comparing a ratio of the first voltage and the second voltage to an expected range of ratios.

36. An apparatus for interfacing an analog telephone instrument to a telephone switching system, comprising:
   a. a signal path for communicating signals between the analog telephone instrument and the telephone switching system;
   b. means for identifying a communication protocol utilized by the telephone switching system from among a plurality of communication protocols; and
   c. means for configuring the signal path according to the protocol, such that if the analog telephone instrument and the telephone switching system operate according a same protocol signals are passed unaltered and if the analog telephone instrument and the telephone switching system operate according different protocols one from the other, the signals are translated as they are passed between the analog telephone instrument and the telephone switching system.

* * * * *

UNITED STATES PATENT AND TRADEMARK OFFICE
CERTIFICATE OF CORRECTION

PATENT NO. : 6,343,126 B1
DATED : January 29, 2002
INVENTOR(S) : Bruce Stelman

It is certified that error appears in the above-identified patent and that said Letters Patent is hereby corrected as shown below:

<u>Column 13,</u>
Line 34, replace the last word "conduction" with -- conjunction --.

Signed and Sealed this

Twenty-third Day of April, 2002

Attest:

*Attesting Officer*

JAMES E. ROGAN
*Director of the United States Patent and Trademark Office*